United States Patent
Hong et al.

(10) Patent No.: US 7,598,103 B2
(45) Date of Patent: Oct. 6, 2009

(54) LIQUID CRYSTAL DISPLAY PANEL WITH DIFFERENT SUBSTRATE MATERIALS AND METHOD OF MAKING THE LIQUID CRYSTAL DISPLAY PANEL

(75) Inventors: Wang-su Hong, Gyeonggi-do (KR); Woo-jae Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/439,387

(22) Filed: May 22, 2006

(65) Prior Publication Data
US 2007/0012925 A1    Jan. 18, 2007

(30) Foreign Application Priority Data
Jun. 8, 2005    (KR) .................. 10-2005-0048794

(51) Int. Cl.
*H01L 21/00*    (2006.01)
(52) U.S. Cl. ................... 438/30; 438/29; 438/151; 438/464
(58) Field of Classification Search ............ 438/29, 438/30, 149, 150, 151, 458, 464
See application file for complete search history.

(56) References Cited

U.S. PATENT DOCUMENTS

| | | | |
|---|---|---|---|
| 6,682,963 B2 * | 1/2004 | Ishikawa | 438/149 |
| 6,891,578 B2 * | 5/2005 | Yonehara et al. | 349/43 |
| 6,939,782 B2 * | 9/2005 | Aspar et al. | 438/455 |
| 2005/0148121 A1 * | 7/2005 | Yamazaki et al. | 438/149 |
| 2007/0013829 A1 * | 1/2007 | Stephenson et al. | 349/86 |

FOREIGN PATENT DOCUMENTS

| | | |
|---|---|---|
| JP | 2001-021904 | 1/2001 |
| JP | 2003-275884 | 9/2003 |
| KR | 1020020092817 A | 10/2004 |

\* cited by examiner

*Primary Examiner*—Kevin M Picardat
(74) *Attorney, Agent, or Firm*—Haynes and Boone, LLP

(57) ABSTRACT

An LCD panel with mixed substrate materials and a method of making the LCD panel are presented. The LCD panel is made of a first substrate, a second substrate disposed substantially parallel to the first substrate, and a liquid crystal layer disposed between the first substrate and the second substrate. The first substrate includes a glass substrate, a TFT formed on the glass substrate, and a color filter formed on the TFT. The second substrate includes a plastic substrate and a common electrode formed on the plastic substrate. Forming the color filter on the TFT eliminates the need to form black matrices on the second substrate, preventing misalignment of the two substrates due to different heat sensitivities. Since there is no concern of substrate misalignment caused by heat, laser beam can be used to cut the substrates during the manufacture of the LCD panel.

25 Claims, 14 Drawing Sheets

LIQUID CRYSTAL DISPLAY PANEL WITH DIFFERENT SUBSTRATE MATERIALS AND METHOD OF MAKING THE LIQUID CRYSTAL DISPLAY PANEL

CROSS-REFERENCE TO RELATED APPLICATIONS

This application claims the benefit of Korean Patent Application No. 2005-0048794, filed on Jun. 8, 2005 in the Korean Intellectual Property Office, which is hereby incorporated by reference for all purposes.

BACKGROUND OF THE INVENTION

1. Field of the Invention

The present invention relates to a liquid crystal display panel, and more particularly to a method of cutting the substrates of a liquid crystal display panel.

2. Description of the Related Art

Typically, a liquid crystal display ("LCD") device includes an LCD panel having a first substrate, a second substrate disposed opposite to the first substrate, and a liquid crystal layer disposed between the two substrates. Thin film transistors ("TFTs") are formed on the first substrate. Since the LCD panel does not emit light, the LCD is often used in conjunction with a backlight unit disposed behind the first substrate to act as a light source.

Light transmittance through the LCD panel is controlled by varying the arrangement of the liquid crystals in the liquid crystal layer.

The LCD device has a driving circuit applying driving signals to a gate line and a data line. The gate line and data line are formed on a TFT substrate to form a display area. The driving circuit comprises a gate driving chip, a data driving chip, and a printed circuit board ("PCB") on which a timing controller and a driving voltage generating part are formed.

The LCD employs a plastic substrate instead of a conventional glass substrate in order to be light and slim. The plastic substrate is used for the second substrate, which may be formed without a high-temperature process. However, a problem with the LCD panel that includes both plastic substrate and glass substrate is that the cutting process is complicated. As the complicated cutting process increases the manufacturing cost of the LCD, a cost-effective, simple method of cutting an LCD with different substrate materials is desired.

SUMMARY OF THE INVENTION

The present invention provides an LCD panel with different substrate materials and a method of making the LCD panel.

In one aspect, the invention is an LCD panel that has a first substrate comprising a glass substrate, a second substrate comprising a plastic substrate, and a liquid crystal layer disposed between the first substrate and the second substrate. The first substrate also includes a TFT formed on the glass substrate and a color filter formed on the TFT. The second substrate includes a common electrode formed on the plastic substrate and disposed substantially parallel to the first substrate.

In another aspect, the invention is a method of making an LCD panel with different substrate materials. The method entails attaching a first substrate to a second substrate, wherein the first substrate includes a glass substrate and the second substrate includes a plastic substrate. The first and second substrates are irradiated with a laser beam to cut the first and the second substrates along a beam path.

In yet another aspect, the invention is a method of making an LCD panel. The method entails adhering a first substrate to a second substrate, the first substrate including a plastic substrate and the second substrate including a glass substrate, the first substrate having an overlap area that overlaps the second substrate and a pad area that extends beyond the second substrate. A pad is formed in the pad area. A laser beam is directed to the first substrate and the second substrate along edges of the overlap area to cut the first substrate and the second substrate with the laser beam.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENT

Figure 1:
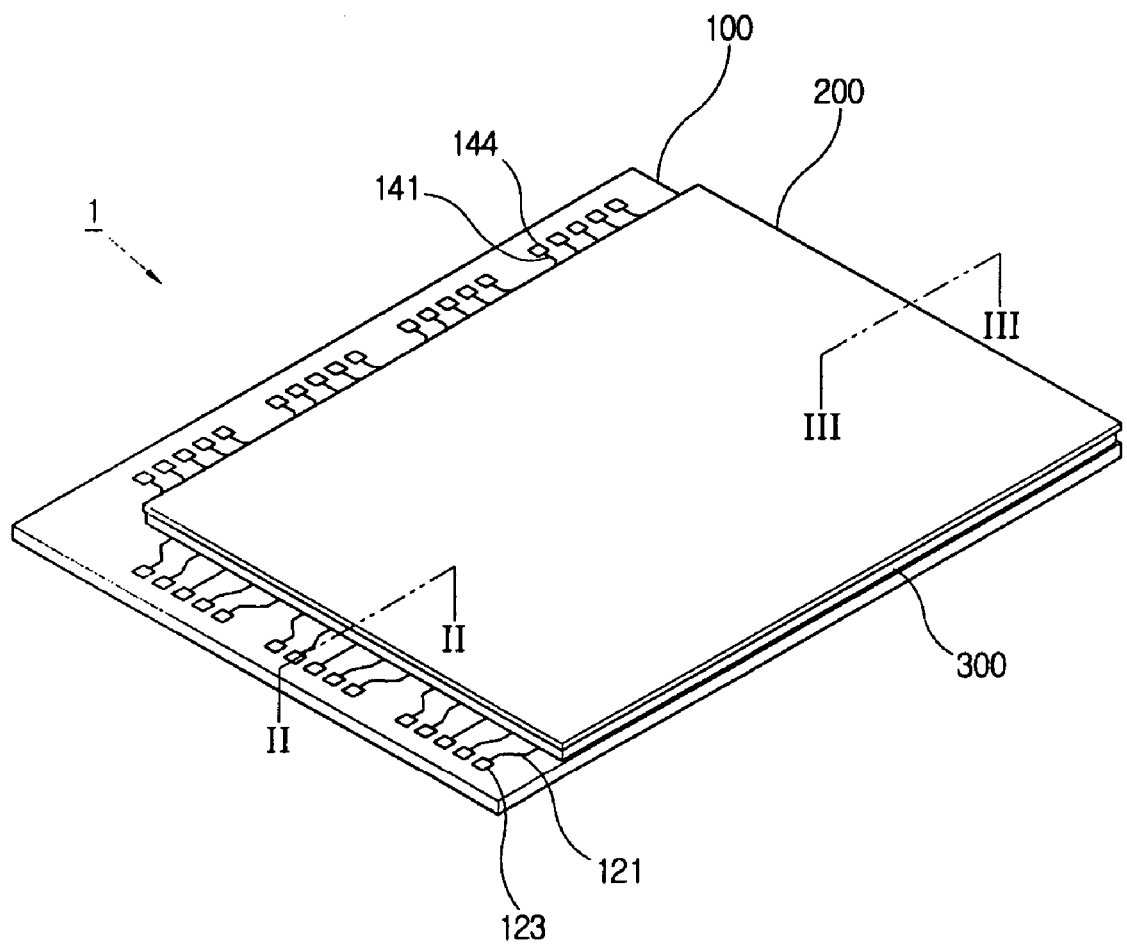
FIG. 1 is a perspective view of an LCD panel according to a first embodiment of the present invention.
Figure 2:
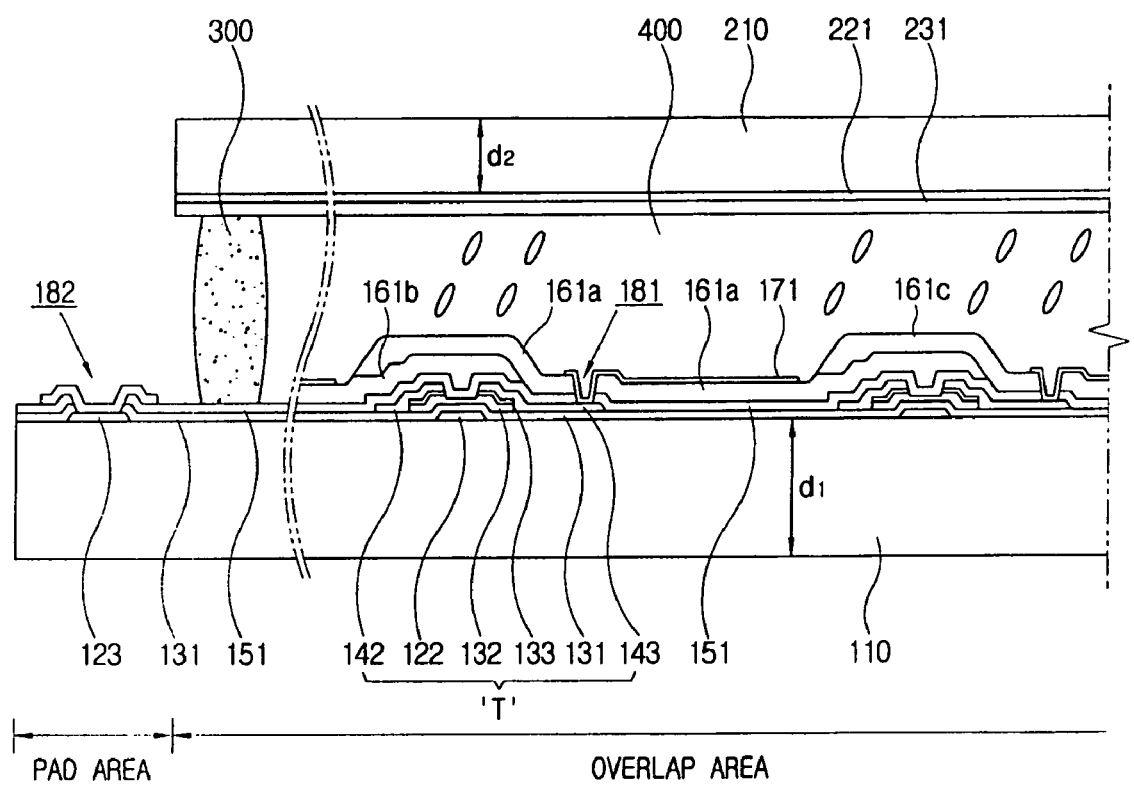
FIG. 2 is a sectional view, taken along the line II-II of FIG. 1.
Figure 3:
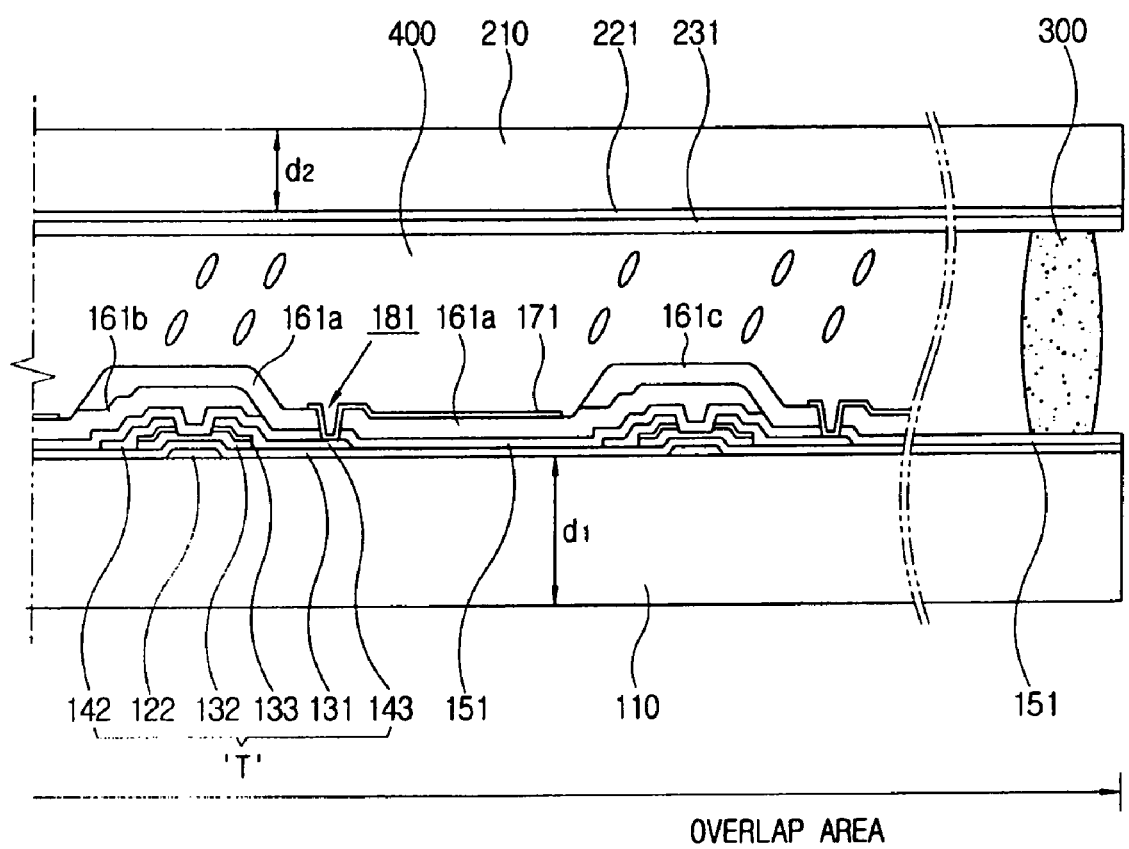
FIG. 3 is a sectional view, taken along the line III-III of FIG. 1.

Reference will now be made in detail to the embodiments of the present invention, examples of which are illustrated in the accompanying drawings wherein like reference numerals refer to like elements throughout. The embodiments are described below so as to explain the present invention by referring to the figures.

An LCD panel 1 includes a first substrate 100 on which TFTs (T) are formed, a second substrate 200 disposed opposite the first substrate 100 and on which a common electrode 221 is formed, a sealant 300 coupling the two substrates 100, 200, and a liquid crystal layer 400 disposed between the substrates 100, 200 and contained by the sealant 300. The substrates 100, 200 have a rectangular shape, and the first substrate 100 is bigger than the second substrate 200. The first substrate 100 has an overlapping area where it overlaps the second substrate 200 and a pad area that extends beyond the second substrate 200. The TFT (T) and the sealant 300 are formed in the overlapping area, and a gate pad 123 and a data pad 144 are formed in the pad area to connect with an external circuit. The pad area is formed along two connected sides of the rectangularly-shaped first substrate 100.

The first substrate 100 will now be described. The description will focus on the gate pad 123. The data pad 144 is not separately described because it is similar to the gate pad 123.

A gate line assembly is formed on a glass substrate 110. The gate line assembly includes a gate line 121, a gate electrode 122, and a gate pad 123. The gate line 121 extends in a first direction. The gate electrode 122 is part of the TFT that is connected to the gate line 121. The gate pad 123 is disposed on an end portion of the gate line 121, where the gate pad 123 is enlarged to connect with an external circuit.

A gate insulating layer 131 is formed on the glass substrate 110 and the gate line assembly. The gate insulating layer 131 is formed of silicon nitride (SiNx) or the like.

A semiconductor layer 132 formed of amorphous silicon or the like is formed on the gate insulating layer 131 of the gate electrode 122. An ohmic contact layer 133 is formed on the semiconductor layer 132. The ohmic contact layer 133 is formed of n+ hydrogenated amorphous silicon, which is highly-doped with silicide or n-type impurities. The semiconductor layer 132 is formed as an island on the gate electrode 122 and the ohmic contact layer 133 is divided into two parts with respect to the gate electrode 122.

A data line assembly is formed on the ohmic contact layer 133 and the gate insulating layer 131. The data line assembly includes a data line 141 extending in a second direction and crossing the gate line 121 to define a pixel. The data line assembly also includes a source electrode 142, a drain electrode 143, and the data pad 144. The source electrode 142 branches out from the data line 141 and extends over the ohmic contact layer 133. The drain electrode 143 is separated from the source electrode 142 and formed across the gate electrode 122 from the source electrode 142. The data pad 144 is formed at an end of the data line 141, where the width of the data pad 144 is enlarged to connect with the external circuit.

A protective layer 151 is formed on the data line assembly (the data line 141, the source electrode 142, the drain electrode 143, and the data pad 144) and the portion of the semiconductor 132 that is not covered with the data line assembly. The protective layer 151 is formed of a SiNx layer, a Si:C:O layer, a Si:O:F layer, or an acryl-based organic insulating layer, etc. The Si:C:O layer and the Si:O:F layer are formed through PECVD (plasma enhanced chemical vapor deposition). The protective layer 151 has a contact hole 181 exposing the drain electrode 143 and a contact hole 182 exposing the gate pad 123. Color filters 161a, 161b, 161c are removed from the portion of the drain electrode 143 that is exposed through the contact hole 181. Similarly, the gate insulating layer 131 is removed from the portion of the gate pad 123 that is exposed through the contact hole 182.

The color filters 161a, 161b, 161c are formed on the protective layer 151. The color filters 161a, 161b, 161c include red, green, and blue filters or cyan, magenta, and yellow filters that are repeatedly formed on the protective layer 151. Two of the color filters 161a, 161b, 161c are overlapped on the TFT (T) to function as a black matrix. In some embodiments, the color filters 161a, 161b, 161c are laid out such that three colors overlap one another. Since the overlapping color filters function as a black matrix, a separate black matrix is not formed on the second substrate 200.

Transparent electrodes 171, 172 made of ITO (indium tin oxide) or IZO (indium zinc oxide) are formed on the color filters 161a, 161b, 161c. The transparent electrodes 171, 172 include a pixel electrode 171 connected to the drain electrode 143 through the contact hole 181 and a contact subsidiary part 172 covering the gate pad 123 through the contact hole 182.

Now, the second substrate 200 disposed opposite the first substrate 100 will be described.

The second substrate 200 includes a plastic substrate 210, a common electrode 221 and an alignment film 231, wherein the common electrode 221 and the alignment film 231 are sequentially formed on the plastic substrate 210.

The plastic substrate 210 may be formed of polycarbon, polyimide, polyethersulfone (PES), polyarylate (PAR), polyethylenenaphthalate (PEN), or polyethylene terephthalate (PET), among other suitable materials.

The thickness d2 of the plastic substrate 210 is less than the thickness d1 of the glass substrate 110. For example, d1 is about 0.5 mm and d2 is about 0.2 mm. Since the plastic substrate 210 is thin, the total weight of the LCD panel 1 is low. The plastic substrate 210 also imparts flexibility to the LCD panel 1.

When using the plastic substrate 210, it is preferable to maintain a processing temperature in a range of about 150° C. to about 200° C.

The common electrode 221 directly contacts the plastic substrate 210 to cover the plastic substrate 210. The common electrode 221 is formed of ITO or IZO by a sputtering method at a temperature below 100° C.

The alignment film 231 is formed on the common electrode 221. The alignment film 231 is generally formed of polyimide and is rubbed to align liquid crystal molecules in a uniform direction.

The sealant 300 is formed in the outer part of the first and second substrates 100, 200. The sealant 300 is formed along the circumference of the LCD panel 1 and contains a curable resin like an acryl resin that may be cured by ultraviolet radiation. Further, the sealant 300 may contain a heat-hardening epoxy resin, an amine-based hardening agent, a filler (e.g., alumina powder), and/or a spacer.

The liquid crystal layer 400 is disposed in the space enclosed by the first and second substrates 100, 200 and the sealant 300 and changes its alignment according to the voltage difference between the pixel electrode 171 and the common electrode 221.

The plastic substrate 210 is more sensitive to heat than the glass substrate 110, and deforms more easily at a certain temperature range. As deformation of a substrate could cause misalignment of the first and second substrates 100, 200, defect rate could become a serious problem when the LCD increases in resolution and more heat is generated. If the second substrates 200 comprises a black matrix, the black matrix have to be arranged to correspond to the gate line 121 and the data line 141 of the first substrate 100 when the two substrates 100, 200 are adhered. Here, misalignment between the two substrates 100, 200 can lower the quality of the LCD panel 1. The LCD panel 1 according to the present invention avoids the misalignment of the first and second substrates 100, 200 by not forming the black matrix is on the second substrate 200.

Hereinafter, a method of making the LCD panel 1 according to an embodiment of the present invention will be described in reference to FIGS. 4a through 4g.

Figure 4A:
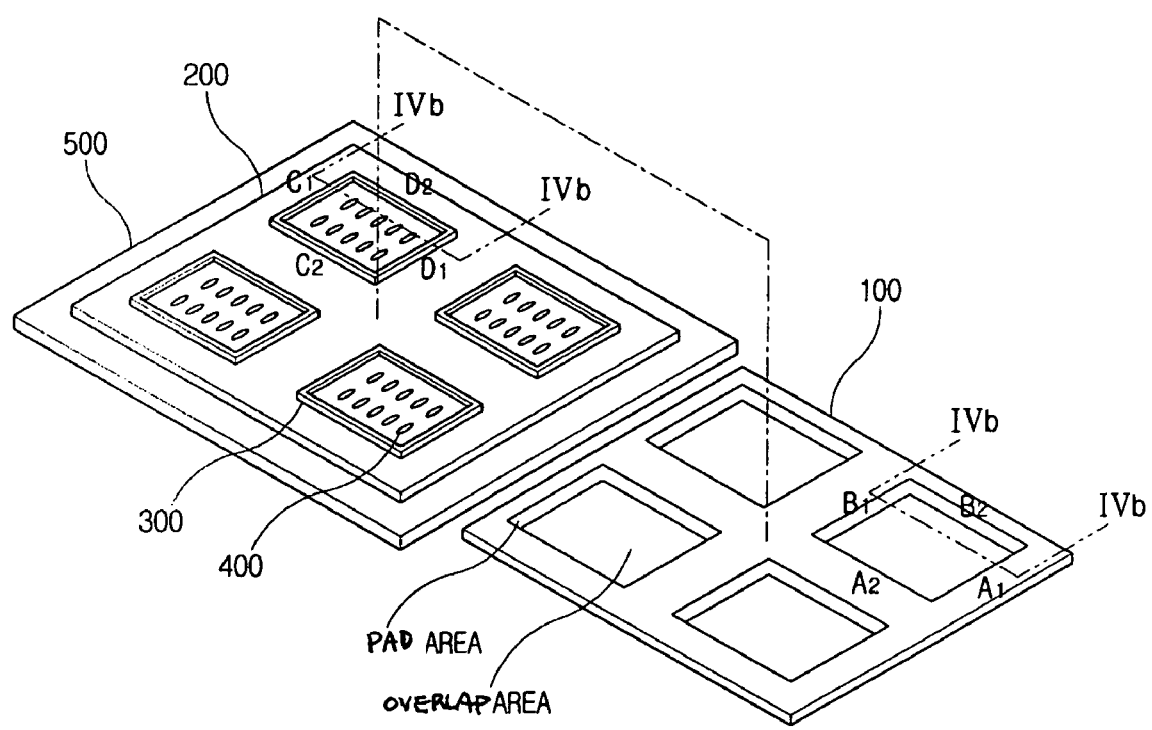
FIGS. 4a through 4h are drawings to illustrate a method of making the LCD panel according to the first embodiment of the present invention.

As shown in FIG. 4a, the second substrate 200 is initially supported by a dummy glass substrate 500. Since the plastic substrate 210 of the second substrate 200 is thin and flexible and difficult to handle, the dummy glass substrate 500 facilitates the transferring and moving of the plastic substrate 210 by providing a rigid support. The dummy glass substrate 500 adheres to the second substrate 200. The thickness d3 of the dummy glass substrate 500 is thicker than the thickness d2 of the plastic substrate 210.

The first substrate 100 and the second substrate 200, which are mother substrates, are attached to each other by the sealant 300 and are cut, thereby being formed into a plurality of LCD panels 1. In the example of FIG. 4a, four LCD panels 1 are manufactured together. As shown, the rectangular second substrate has sides C1 and D1 that are parallel to each other and sides C2 and D2 that are parallel to each other. The first substrate has sides A1 and B1 that are parallel to each other and sides A2 and B2 that are parallel to each other.

The first substrate 100 and the second substrate are manufactured by any suitable conventional process. Four areas used for the LCD panel 1 are formed on the first substrate 100, and each area has the overlap area and the pad area.

The sealant 300 is deposited on the second substrate 200 along the substrate's circumference, generally outlining the overlap area. To deposit the sealant 300 in a desirable pattern, a screen mask method and/or a dispense method may be used. The screen mask method is widely used due to its convenience. However, it may be disadvantageous because while the screen mask contacts the alignment film during the deposition process, it is hard for the screen mask to keep up with the size increase of the substrate. If the screen mask is not of the proper size, a defect can result. Due to this disadvantage with the screen mask method, the dispense method may be preferred.

Liquid crystals are placed inside the region defined by the sealant 300 using a dropping method. Alternatively, liquid crystals may be injected into the area defined by the sealant 300 through an injection hole formed in the sealant 300. In this case, the substrate adhered by the sealant 300 is cut into a plurality of LCD panels 1 and the liquid crystal layer 400 is injected by a filling method using vacuum and nitrogen pressure.

Figure 4B:
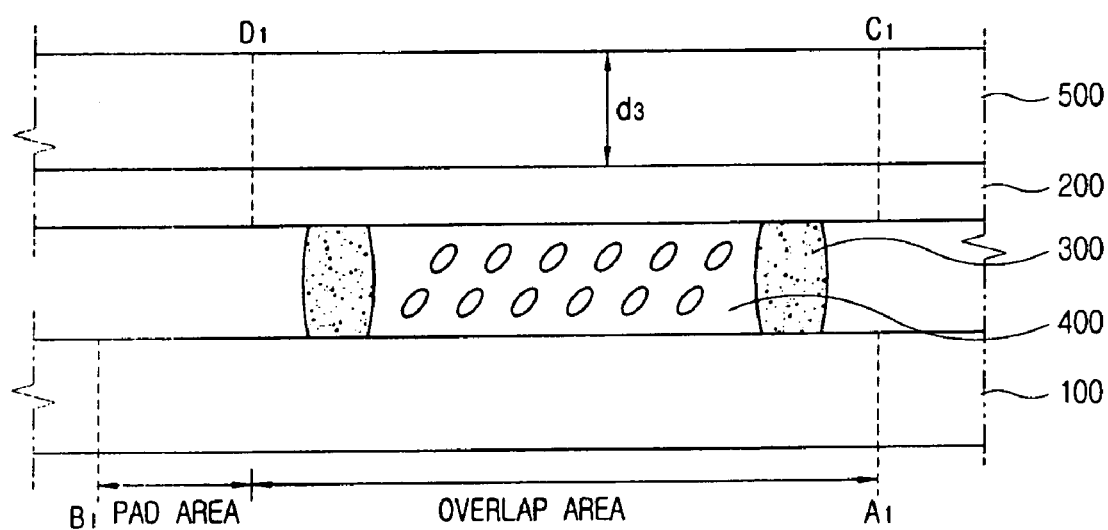

As shown in FIG. 4b, the second substrate 200 is arranged on the first substrate 100. In arranging the first and second substrates 100, 200, a side A1 of the first substrate 100 is aligned with a side C1 of the second substrate 200, and a side A2 (not shown) of the first substrate 100 corresponds to a side C2 (not shown) of the second substrate 200. A side B1 of the first substrate 100 is outside a side D1 of the second substrate 200, due to the pad area being only in the first substrate 100. Similarly, although not shown in FIG. 4b, a side B2 of the first substrate 100 is situated outside a side D2 of the second substrate 200.

Figure 4C:
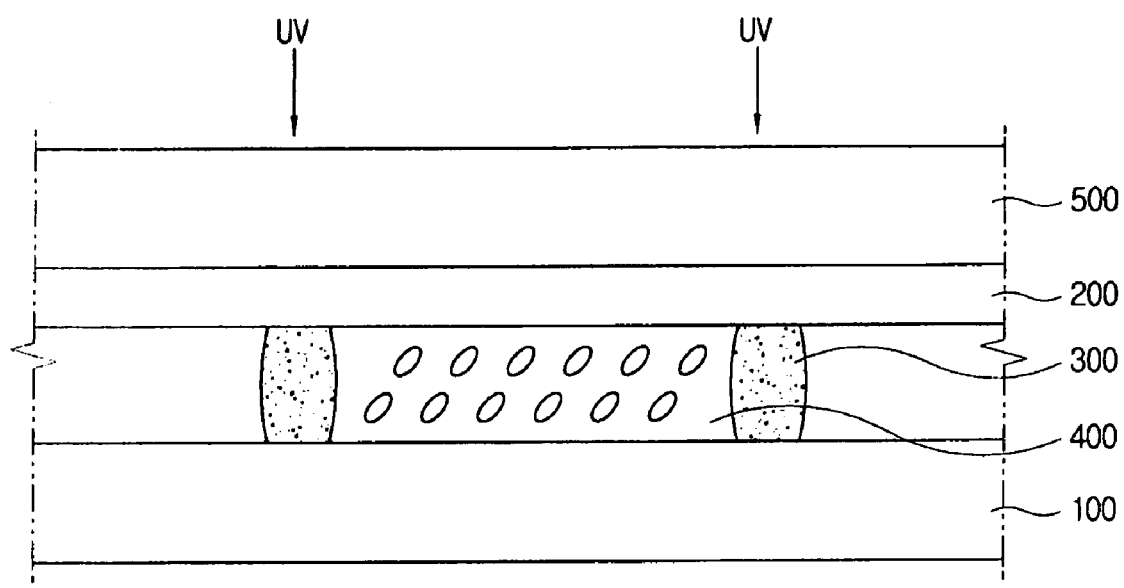

Then, the sealant 300 is irradiated with ultraviolet rays and hardened, as shown in FIG. 4c. Upon the curing of the sealant 300, the first and second substrates 100, 200 are attached to each other.

Figure 4D:
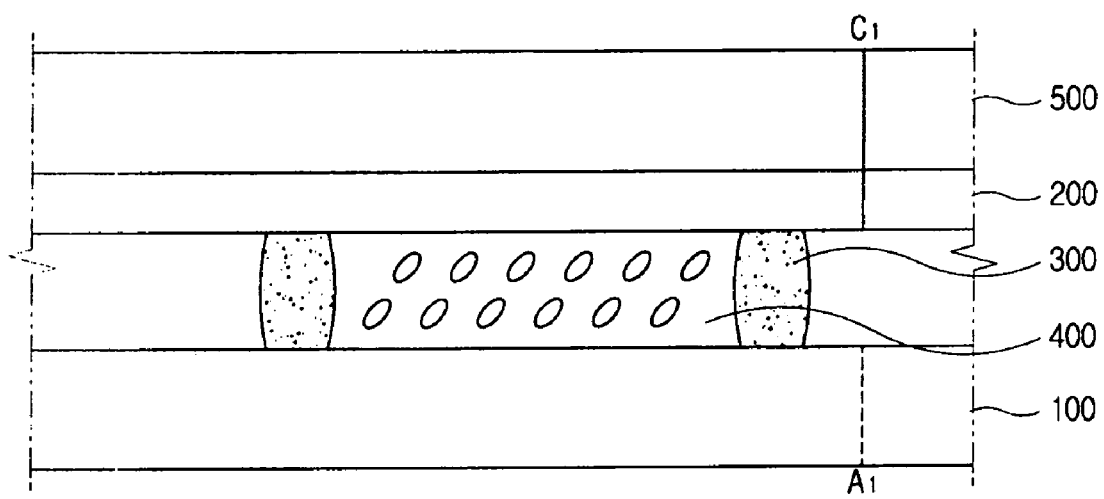

Next, as shown in FIG. 4d, the side A1 of the first substrate 100 and the side C1 of the second substrate 200 are irradiated with laser at the same time. Nd:YAG laser or carbon dioxide are used as a source of laser. The plastic substrate 210 is cut by the heat of the laser, so that the second substrate 200 is cut along the side C1. The dummy glass substrate 500 is not directly cut by the heat but is partly heated by the laser along the side A1 of the first substrate 100. A cutting mark may form on the parts of the dummy glass substrate 500 and the first substrate 100 that are heated. Here, the cutting mark does not mean that the dummy glass substrate 500 and the first substrate 100 are cut at this stage. The cutting mark refers to a portion of the dummy glass substrate 500 and the first substrate 100 which is different from other portion due to laser.

Figure 4E:
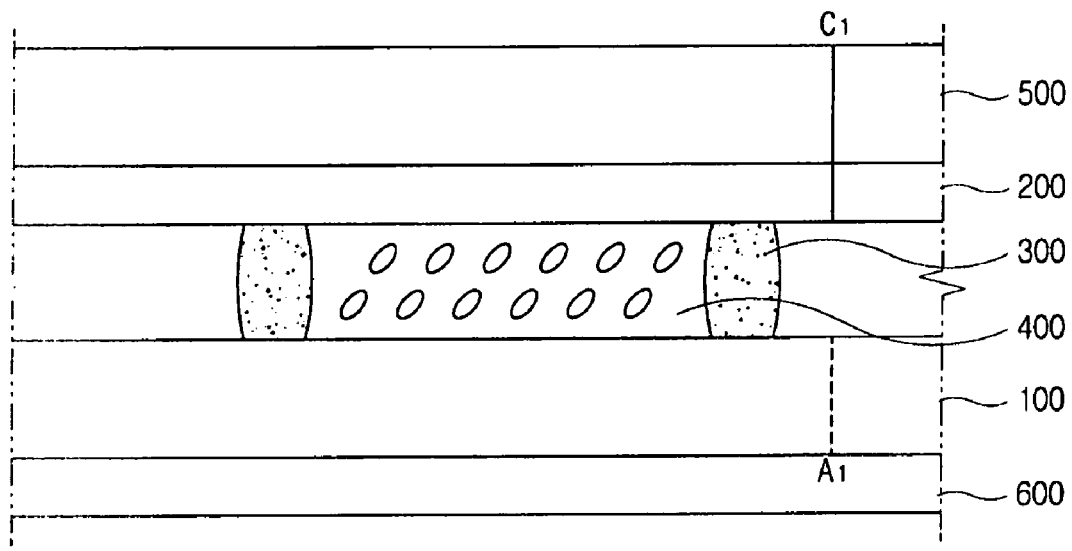

After the laser irradiation, a cooling plate 600 is immediately placed in contact with the first substrate 100 and the dummy glass substrate 500, as shown in FIG. 4e. The cooling plate 600 maintains a temperature less than about 25° C. and is formed of a metal plate. The glass substrate 110 and the dummy glass substrate 500, which are partly heated, quickly contract upon contacting the cooling plate 600. Upon contracting, the glass substrate 110 and the dummy glass substrate 500 are cut. The side A2 of the first substrate 100 and the side C2 of the second substrate 200 are cut by the same method, although not shown in FIG. 4e.

Figure 4F:
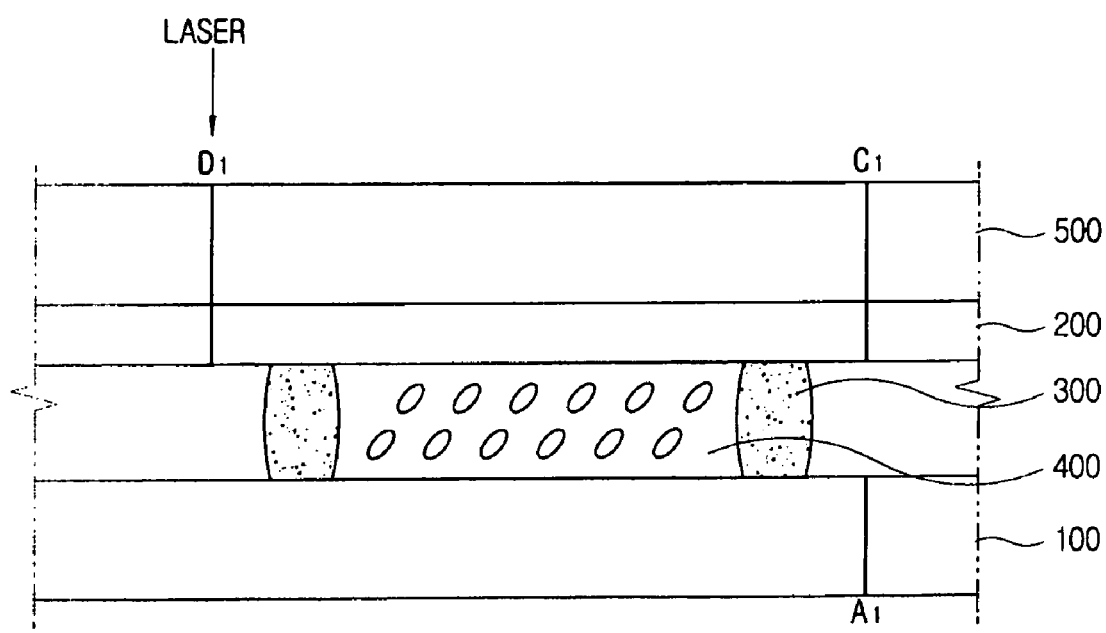

As shown in FIG. 4f, the second substrate 200 is cut by the laser along the side D1 of the second substrate 200. Preferably, the first substrate 100 is not irradiated in this process. Also, the side D2 of the second substrate 200 is cut by the same method, although not shown in FIG. 4f. After the laser irradiation, the dummy glass substrate 500 contacts the cooling plate 600.

Figure 4G:
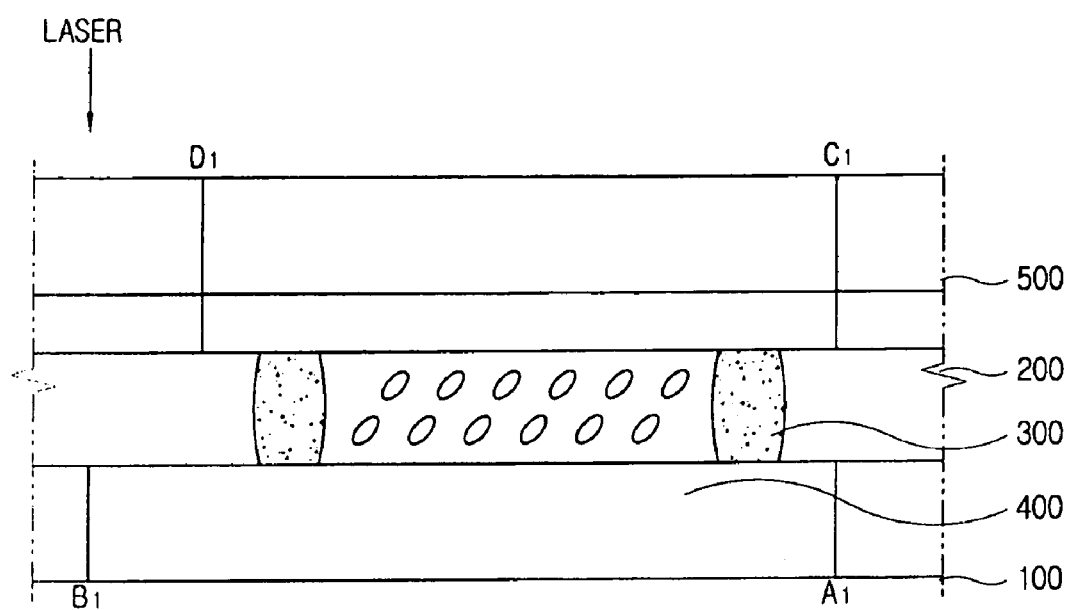

Then, as shown in FIG. 4g, the first substrate 100 is cut by the laser along the side B1 of the first substrate 100. After the laser irradiation, the first substrate 100 contacts the cooling plate 600. Preferably, the second substrate 200 is not irradiated in this process. Although not shown, the side B2 of the first substrate 100 is cut by the same method.

Figure 4H:
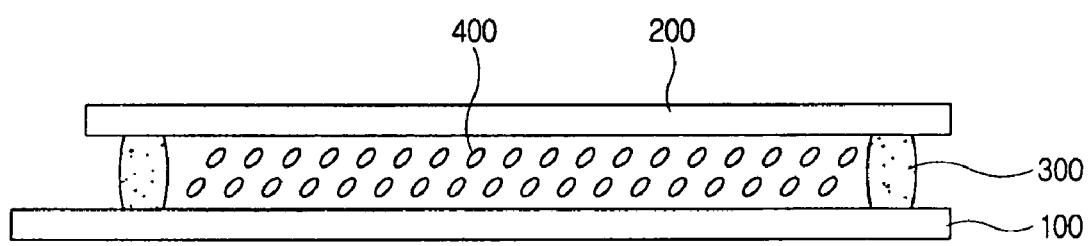

After the cutting process, the dummy glass substrate 500 is removed, thereby completing the manufacture of the LCD panel 1 in FIGS. 4h and 1. Details of the cutting process is not limited to the aforementioned, and may be varied.

Now, other embodiments of the present invention will be described in reference to FIGS. 5 through 7.

Figure 5:
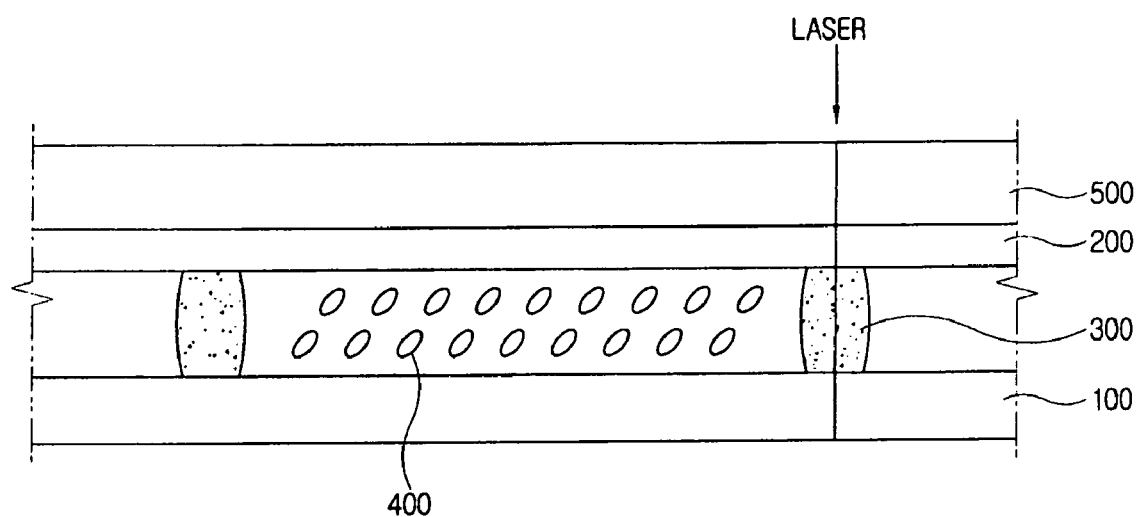
FIG. 5 is a diagram to illustrate a method of making an LCD panel according to a second embodiment of the present invention.

FIG. 5 shows a second embodiment where a sealant 300 is cut. The sealant 300 is directly cut by heat using a laser, similarly to the plastic substrate 210.

Figure 6:
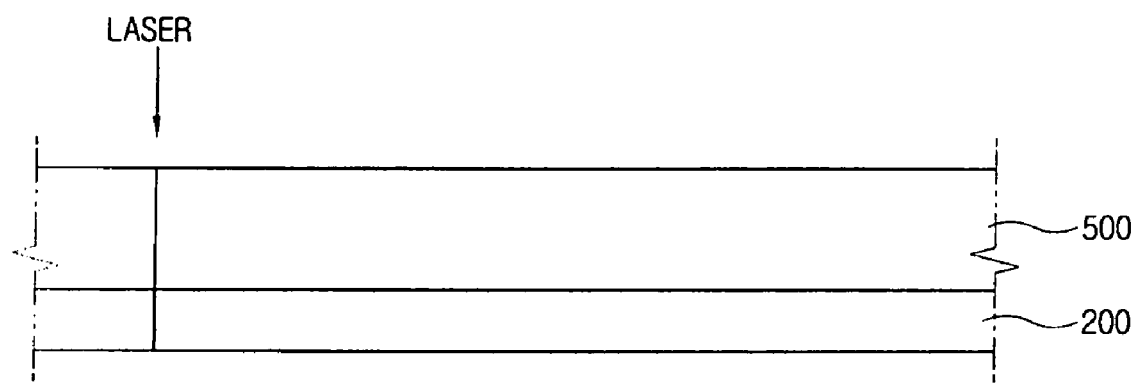
FIG. 6 is a diagram to illustrate a method of making an LCD panel according to a third embodiment of the present invention.

FIG. 6 shows a third embodiment where the second substrate 200 adhering to a dummy glass substrate 500 is cut. If necessary, the second substrate 200 is cut before being attached to a first substrate 100. After laser irradiation, the dummy glass substrate 500 is placed in contact with the cooling plate 600.

Figure 7:
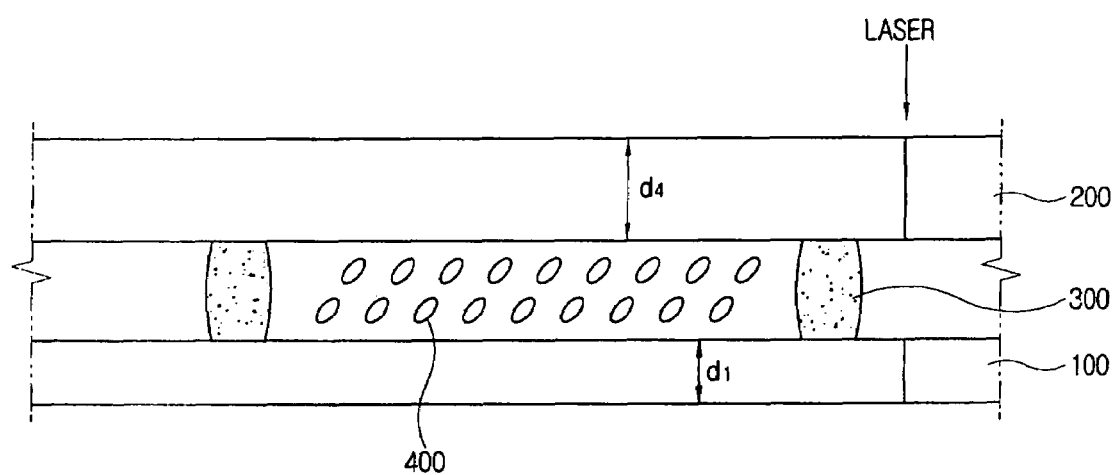
FIG. 7 is a diagram to illustrate a method of making an LCD panel according to a fourth embodiment of the present invention.

FIG. 7 shows a fourth embodiment where a second substrate 200 is cut without being attached to a dummy glass substrate 500. When the thickness d4 of the second substrate 200 is high, e.g. more than 0.7 mm, the dummy glass substrate 500 is not be used. Without the dummy glass substrate 500, it is not necessary to place the second substrate 200 in contact with the cooling plate 600 after laser irradiation. Therefore, laser is shined onto the second substrate from the top, allowing the first substrate 100 to easily contact the cooling plate 600.

It will be apparent to those skilled in the art that various modifications and variation can be made in the present invention without departing from the spirit or scope of the invention. Thus it is intended that the present invention cover the modifications and variations of this invention provided they come within the scope of the appended claims and their equivalents.

What is claimed is:

1. A method of making an LCD panel comprising:
    attaching a first substrate having thin films formed thereon to a second substrate having thin films formed thereon, wherein the first substrate includes a glass substrate and the second substrate includes a plastic substrate; and
    irradiating the first and the second substrates with a laser beam to cut the first and the second substrates along a beam path while they are attached to each other.

2. The method of claim 1, further comprising cooling the first substrate.

3. The method of claim 2, wherein the cooling is performed by contacting the first substrate with a cooling plate of 25° C. or less.

4. The method of claim 1, wherein the laser is shined onto a surface of the second substrate that is not covered by the first substrate.

5. The method of claim 1, wherein the laser uses carbon dioxide as a source.

6. The method of claim 1, wherein the second substrate is supported by a dummy glass substrate.

7. The method of claim 6, further comprising:
cooling the first substrate;
wherein the irradiating further comprises irradiating a surface of the second substrate with the laser beam; and
wherein the second substrate is cut by the irradiating and the dummy glass substrate is cut by the irradiating and the cooling.

8. The method of claim 1, wherein the first substrate and the second substrate are attached to each other by a sealant.

9. The method of claim 8, wherein the sealant is at least partly cut by the laser beam.

10. The method of claim 8, wherein a liquid crystal layer is disposed between the first substrate and the second substrate.

11. The method of claim 1, wherein the thin films of the first substrate comprise a TFT and a color filter formed on the TFT.

12. The method of claim 1, wherein the plastic substrate is thinner than the glass substrate.

13. The method of claim 1, wherein the second substrate is supported by a dummy glass substrate, the thin films of the first substrate comprise a TFT, and the thin films of the second substrate comprise a common electrode.

14. The method of claim 1, wherein the thin films of the first substrate comprise a common electrode and the thin films of the second substrate comprises a TFT.

15. The method of claim 1, wherein the second substrate is supported by a dummy glass substrate, the thin films of the first substrate comprise a common electrode, and the thin films of the second substrate comprise a TFT.

16. The method of claim 1, wherein the laser is shined onto at least one of a surface of the first substrate and a surface of the second substrate.

17. A method of making an LCD panel comprising:
adhering a first substrate having thin films formed thereon to a second substrate having thin films formed thereon, the first substrate comprising a glass substrate and the second substrate comprising a plastic substrate, the first substrate having an overlap area that overlaps the second substrate and a pad area that extends beyond the second substrate; and
directing a laser beam to the first substrate and the second substrate along edges of the overlap area to cut the first substrate and the second substrate with the laser beam while they are attached to each other.

18. The method of claim 17, further comprising:
cooling the first substrate;
wherein the directing further comprises directing the laser beam onto a surface of the second substrate; and
wherein the second substrate is cut by the directing and the first substrate is cut by the directing and the cooling.

19. The method of claim 17, wherein the second substrate is supported by a dummy glass substrate while receiving the laser beam.

20. The method of claim 19, wherein the laser beam is irradiated onto a surface of the dummy glass substrate that is not covered by the second substrate.

21. The method of claim 17, further comprising directing the laser beam along a circumference of the pad area to cut the first substrate.

22. The method of claim 17, further comprising directing the laser beam along a circumference of the overlap area to cut the second substrate.

23. A method of making an LCD panel comprising:
forming a gate electrode, a semiconductor layer, a source electrode, a drain electrode layer, and a pixel electrode in sequence on a first substrate, wherein the first substrate includes a glass substrate;
attaching the first substrate to a second substrate, wherein the second substrate includes a plastic substrate; and
irradiating the first and the second substrate with a laser beam to cut the first and the second substrates along a beam path.

24. The method of claim 23 further comprising cooling the first substrate.

25. The method of claim 24, wherein the cooling is performed by contacting the first substrate with a cooling plate of 25° C. or less.

* * * * *